Patented Mar. 2, 1954

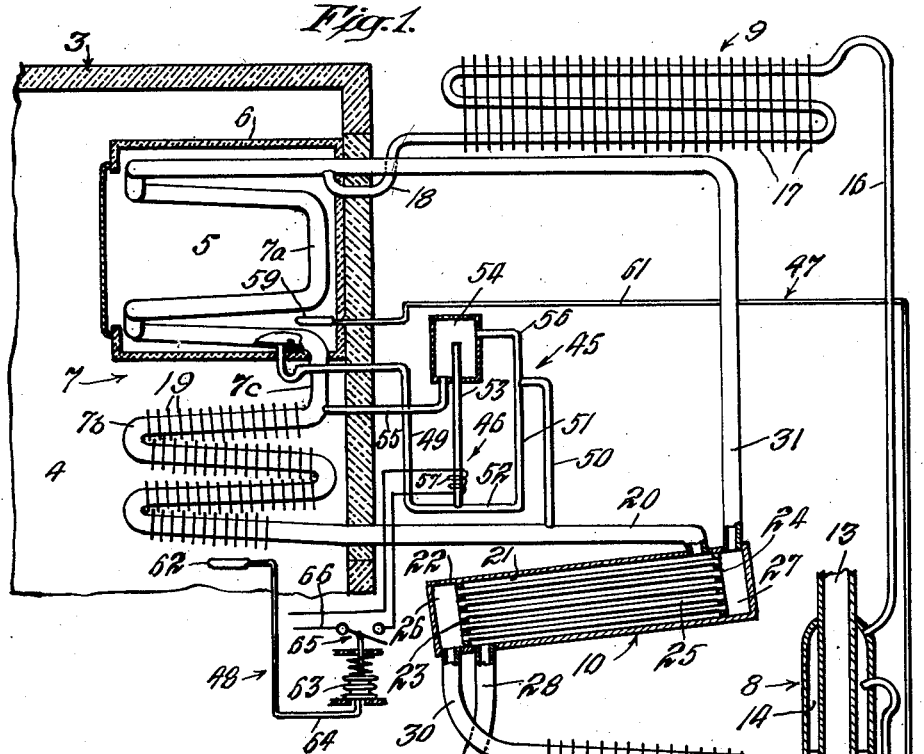

2,670,607

UNITED STATES PATENT OFFICE 2,670,607

MULTIPLE TEMPERATURE EVAPORATOR

William R. Hainsworth, Puente, Calif., assignor to Servel, Inc., New York, N. Y., a corporation of Delaware Application August 16, 1952, Serial No. 304,772

8 Claims. (Cl. 62—5)

The present invention relates to refrigeration and more particularly to refrigeration apparatus for maintaining the desired temperatures in the separate freezing and food storage compartments of a refrigerator cabinet.

Refrigerators usually comprise a high temperature food storage space which should be maintained at a cooling temperature above freezing and a freezing compartment which should be maintained at a low temperature below freezing. In accordance with a recent trend the low temperature compartment is insulated from the food storage space to insure a constant low temperature for storing frozen foods over a long period of time. To maintain these separate compartments at different and substantially constant temperatures with the same refrigeration system presents a difficult problem because of variations in load conditions.

The varying load conditions comprise variations in the ambient temperature from day to day, variations in the relative amounts of foods stored in the freezing and food storage compartments, and variations in the normal use of the refrigerator at different periods during a day and the relative use of the two compartments. The evaporator may be constructed in separate sections for the separate compartments and connected in series for the continuous flow of refrigerant therethrough. If the heat transfer surfaces of the different sections are designed for the worst operating condition, the load on the two sections can be properly balanced for that condition. However, under a more favorable operating condition the low temperature section will produce the desired temperature in the freezing compartment with less refrigerant and deliver more refrigerant to the high temperature section which may result in a freezing temperature in the food storage compartment and the formation of frost on the heat transfer surface.

One of the objects of the present invention is to provide a refrigerator of the type indicated with separate evaporator sections in the freezing and food storage compartments and a novel refrigerant control apparatus to balance the loads on the separate evaporator sections under all operating conditions.

Another object is to provide a refrigeration apparatus with a refrigerant conduit bypassing the high temperature evaporator section and a heat operated vapor liquid lift for delivering refrigerant from the conduit to the high temperature evaporator section in accordance with requirements.

Another object is to provide a refrigerator of the type indicated with a thermostat responsive to the temperature of the freezing compartment for initiating operation of the refrigeration system to supply refrigerant to the low temperature evaporator section and a thermostat responsive to the temperature of the food storage compartment to regulate a vapor liquid-lift for supplying refrigerant to the high temperature evaporator section.

Still another object is to provide a refrigeration apparatus for balancing the load between the freezing and food storage compartments of a refrigerator which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims.

In the drawings:

Fig. 1 is a diagrammatic view of an absorption refrigeration system incorporating the novel features of the present invention and showing the vapor liquid lift for feeding refrigerant flowing from one evaporator section to the other section as required; and Fig. 2 is a diagrammatic view of a refrigerant control arrangement of modified construction.

For purposes of illustration the present invention is shown applied to a refrigerator comprising a cabinet 3 providing a food storage space 4 adapted to be cooled to some temperature above freezing and having a freezing compartment 5 therein insulated from the space 4 by walls 6. It will be understood that the cabinet 3 may have the food storage compartment 4 completely separated from the freezing compartment 5 with separate closures at the outside of the cabinet. The interior of the refrigerator cabinet 3 is refrigerated by a cooling element or evaporator 7 having a low temperature section 7a to maintain a substantially constant temperature in the freezing compartment 5 and a separate high temperature section 7b to maintain a substantially constant temperature above freezing in the food storage space 4.

Evaporator 7 constitutes one element of a single mechanical refrigeration system and for purposes of illustration is shown applied to a three-fluid absorption refrigeration system generally similar to that illustrated and described in United States Letters Patent to Alvar Lenning 2,300,579, issued November 3, 1942, and entitled Refrigeration. Such a refrigeration system comprises a refrigerant circuit for delivering liquid refrigerant to evaporator 7, a gas circuit for delivering an inert gas to the evaporator in which the refrigerant evaporates and diffuses at partial pressure to produce a refrigerating effect, and an absorption solution circuit in which an absorbent is circulated to absorb refrigerant from the gas and from which refrigerant vapor is expelled by the application of heat. The absorption refrigeration system illustrated comprises a generator 8, a condenser 9, the evaporator 7, a gas heat exchanger 10, an absorber 11 and a liquid heat exchanger 12 interconnected for the circulation of refrigerant, absorbent, and the auxiliary pressure equalizing gas.

Generator 8 is in the form of an upright cylindrical vessel having a central or axial flue 13 providing an annular chamber 14 therebetween for absorption solution. Flue 13 is heated by radiant heat and the products of combustion from a fuel burner 15. The top of the annular chamber 14 of generator 8 is connected to the upper end of the condenser 9 by a vapor pipe 16.

Condenser 9 is preferably air cooled and as illustrated comprises a vertically arranged serpentine coil having spaced heat transfer fins 17. The lower or outlet end of condenser 9 is connected to the top of the low temperature evaporator section 7a by a conduit 18.

The evaporator 7 is located in the cabinet 3 to be refrigerated and the remainder of the apparatus is generally located at the exterior of the cabinet. Low temperature evaporator section 7a comprises a section of pipe bent to generally conform to the shape of the interior of the freezing compartment 5 in which it is located but progressively inclined from the top to the bottom so that liquid refrigerant will flow therethrough by gravity. The high temperature section 7b of the evaporator is illustrated in the form of a vertically arranged serpentine coil located in the food storage space 4 and having heat transfer fins 19. The lower end of the low temperature section 7a is connected to the upper end of the high temperature section 7b by a connecting section 7c to provide a continuous path for the flow of gas through the evaporator. Liquid refrigerant, however, is drained from the bottom of the low temperature section 7a and fed to the top of the high temperature section 7b by means later to be described in detail. The lower or outlet end of the high temperature evaporator section 7b is connected by a conduit 20 to one end of chamber 21 of gas heat exchanger 10 constituting one path of flow for the inert pressure balancing gas.

The gas heat exchanger 10 is formed by a cylindrical shell 22 having closed ends and spaced tube sheets 23 and 24 therein provide the chamber 21 therebetween. Tubes 25 extend through the chamber 21 between the tube sheets 23 and 24. The space between the tube sheets 23 and 24 and the ends of shell 22 constitute headers 26 and 27 which together with the tubes 25 constitutes a second path of flow for the pressure balancing inert gas in heat exchange with the gas in chamber 21. A conduit 28 depends from the end of chamber 21 of gas heat exchanger 10 opposite from the end connected to evaporator 7 and is connected to the lower end 29 of absorber 11.

Absorber 11 is also illustrated in the form of a vertically arranged serpentine coil and its upper end 30 is connected to header 26 of gas heat exchanger 10. The opposite header 27 of gas heat exchanger 10 is connected by a conduit 31 to the top of the low temperature evaporator section 7a. The lower end of depending conduit 28 extends beyond its connection to the absorber coil and is connected to the top of an absorber pot 33 and the bottom of the absorber pot is connected to the generator 8 by a conduit 34.

Conduit 34 constitutes the inner passage of liquid heat exchanger 12 and a vapor liquid-lift 35. The lift 35 comprises several turns 35a of conduit 34 wound around a depending portion 13a of flue 13 and an upright portion 35b having its upper end connected to chamber 14 of generator 8 adjacent the top thereof. Surrounding the conduit 34 is a sleeve 36 constituting a second passage 37 of liquid heat exchanger 12. A pipe 38 connects the lower end of generator chamber 14 to one end of the outer sleeve 36 and the opposite end of the sleeve is connected to the upper end or top of the absorber 11 by a riser 39. As illustrated, riser 39 has a hairpin bend with heat transfer fins 40 thereon.

Heat from fuel burner 15 is transferred through the wall of the flue 13 to the solution in chamber 14 to expel refrigerant vapor therefrom. The refrigerant vapor flows through vapor pipe 16 to condenser 9 where it is condensed to a liquid and the liquid refrigerant flows by gravity through the conduit means 18 to the top of the low temperature evaporator section 7a. The liquid refrigerant flowing downwardly through evaporator 7 by gravity evaporates and diffuses into the pressure equalizing gas at partial pressure to produce a refrigerating effect and the heavier mixture of refrigerant and gas flows downwardly into the chamber 21 of the gas heat exchanger 10. Gas laden with refrigerant vapor then flows through the chamber 21 in heat exchange relation with the gas weak in refrigerant flowing from the absorber through the tubes 25 of gas heat exchanger 10 and then through conduit 28 into the bottom of the absorber 11.

Simultaneously, absorption solution weak in refrigerant flows by gravity from the chamber 14 of generator 8 to the top of absorber 11 in a path of flow comprising the pipe 38, outer passage 37 of liquid heat exchanger 12 and conduit 39. Absorption solution flowing downwardly through the absorber 11 absorbs refrigerant vapor from the inert gas in which it is diffused and the lighter gas tends to rise and flow upwardly through the absorber into the header 26 of the gas heat exchanger 10, then through the tubes 25 to the header 27 and from the header through the conduit 31 to the top of the evaporator 7. Thus, circulation of the pressure equalizing gas is initiated by the differential weights of columns of gas strong in refrigerant and gas weak in refrigerant in the gas circuit.

Absorption solution rich in refrigerant flows from the lower end of absorber 11 into the absorber pot 33 and from the latter through the conduit 34. The absorption solution in the coils 35a surrounding the depending extension 13a of flue 13 is heated to expel refrigerant vapor and the expelled vapor lifts the solution through the upright portion 35b of conduit 34 into the top of the chamber 14 of generator 8 for gravity flow through the absorption solution circuit. As thus far described the absorption refrigeration system is substantially identical with that illustrated and described in the Lenning patent, referred to above, except for the particular construction and arrangement of the separate evaporator sections 7a and 7b.

In accordance with the present invention all of the refrigerant liquefied in the condenser 9 is delivered to the top of the low temperature section 7a of evaporator 7 for gravity flow therethrough to insure an adequate supply of refrigerant to maintain the desired low temperature in the freezing compartment 5. Surplus liquid refrigerant overflowing from the bottom of the low temperature evaporator section 7a enters a drain conduit 45 connected to bypass the high temperature evaporator section 7b. A heat operated device 46 is connected to deliver liquid refrigerant from the drain conduit 45 to the top of the high temperature evaporator section 7b for gravity flow therethrough as required. Operation of the refrigeration system is controlled by a thermostat 47 responsive to a temperature condition affected by the low temperature evaporator section 7a and operation of the heat operated device 46 is controlled by a second thermostat 48 responsive to a temperature condition affected by the high temperature evaporator section 7b to regulate the supply of liquid refrigerant to each of the separate evaporator sections as required.

The drain conduit 45 comprises a U-shaped pipe having the upper end of one leg 49 connected to the outlet end of the low temperature evaporator section 7a. An overflow pipe 50 is connected between the other leg 51 of the U-shaped pipe and conduit 20 at the lower or outlet end of the high temperature evaporator section 7b. Thus, pipes 45 and 50 provide a drain conduit bypassing the high temperature evaporator section 7b and the depending bight portion of the U-shaped pipe below the overflow pipe constitutes a liquid trap 52.

The heat operated device 46 comprises a vapor liquid-lift having a lift tube or riser 53 projecting upwardly from the bight portion of the U-shaped pipe 45 constituting the liquid trap 52 and a separating chamber 54 enclosing the upper end of the lift tube. The bottom of the separating chamber 54 is located above the top of the high temperature evaporator section 7b and is connected thereto by a feed conduit 55 through which refrigerant may flow by gravity. The leg 51 of U-shaped conduit 45 extends upwardly beyond the overflow pipe 50 at 56 and is connected to the side of the separating chamber 54 adjacent the top thereof to provide a vent for chamber 54 through which vapor may flow to conduit 20. A heater 57 is provided for heating the lift tube 53 below the liquid level therein and, as illustrated, the heater is in the form of an electric heating element or coil surrounding the lift tube and in thermal contact therewith.

Thermostat 47 for controlling the refrigeration system may be of any suitable construction for operating a gas valve 58 to regulate the supply of gas to the gas burner 15 responsive to a temperature condition affected by the low temperature evaporator section 7a. As illustrated diagrammatically, the thermostat comprises a bulb 59 so located as to be subjected to the temperature in the freezing compartment 5, a bellows 60 connected to actuate the gas valve 58 and a tube 61 connecting the bulb and bellows. The bulb 59, tube 61 and bellows 60 contain a fluid for actuating the bellows upon changes in temperature in the freezing compartment 5 to regulate the amount of gas supplied to the burner 15 in accordance with requirements to maintain a substantially constant temperature in the freezing compartment.

The second thermostat 48 controls the amount of refrigerant supplied to the high temperature evaporator section 7b and also may be of any suitable construction for controlling the energization of the electric heating coil 57 in response to changes in a temperature condition affected by the high temperature evaporator section 7b. The thermostat 48 comprises a bulb 62 so located in cabinet 3 as to be responsive to the temperature of the food storage space 4, a bellows 63 and a tube 64 connecting the bulb and bellows. The bellows 63 is connected to actuate an electric switch 65 in the electric power line 66 connected to the electric heating element 57. The bulb 62 and bellows 63 of the thermostat 48 contain a fluid for actuating the switch 65 to closed position at a predetermined high temperature in the food storage space 4 and open the switch at a predetermined low temperature in the space. One form of the invention having now been described in detail, the mode of operation is explained as follows:

For purposes of description let it be assumed that the freezing compartment 5 is above the desired temperature and that thermostat 47 has opened gas valve 58 to the burner 15. Heat from the gas burner 15 expels refrigerant vapor from absorption solution in the generator 8 and vapor and absorption solution are delivered to the condenser 9 and absorber 11, respectively. Refrigerant liquefied in the condenser 7 flows through the feed conduit 18 to the top of the low temperature evaporator section 7a of the evaporator 7 and the refrigerant flows by gravity from the top to the bottom of the evaporator section. Simultaneously, inert gas weak in refrigerant is delivered to the top of the low temperature evaporator section 7a and the liquid refrigerant evaporates and diffuses into the inert gas at a partial pressure and low temperature to produce a refrigerating effect. If the freezing compartment 5 is at a relatively high temperature the amount of heat transmitted through the walls of the low temperature evaporator section 7a will vaporize all of the liquid refrigerant as it flows therethrough. As the temperature in the freezing compartment 5 decreases, however, the amount of heat transmitted will decrease and the evaporator section is designed to produce and hold the freezing temperature desired when evaporating only a portion of the refrigerant flowing therethrough. Surplus liquid refrigerant at the outlet end of the low temperature evaporator section 7a flows into the drain conduit 45 and fills the U-shaped pipe constituting the liquid trap 52 and builds up in the legs 49 and 51 until it enters the overflow pipe 50 and passes into the conduit 20. Thus, the liquid refrigerant from the low temperature evaporator section 7a bypasses the high temperature evaporator section 7b when the temperature in the food storage space 4 is below the desired temperature.

If the temperature in the food storage space 4 is above the desired temperature the bulb 62 of thermostat 48 will respond to the temperature and actuate the switch 65 to closed position. Upon closure of the switch 65 the heater 57 is energized and being in thermal contact with the lift tube or riser 53 will vaporize a portion of the liquid refrigerant in the lift tube to produce alternate slugs of liquid and vapor therein. This vapor reduces the density of the column in lift tube 53 and the solid columns of liquid in the legs 49 and 51 below the overflow pipe 50 provide the reaction head to continuously raise liquid refrigerant upwardly through the lift tube into the separating chamber 54. Liquid refrigerant delivered to the separating chamber 54 flows by gravity through the feed pipe 55 into the top of the high temperature evaporator section 7b and flows therethrough by gravity. Simultaneously, gas from the low temperature section 7a flows through the connecting portion 7c of the evaporator to the high temperature section 7b. The liquid refrigerant then evaporates and diffuses into the gas in the manner as previously explained with respect to the low temperature section 7a but at a higher partial pressure and temperature to produce a refrigerating effect in the food storage space 4. The vapor liquid-lift 46 will continue to deliver all of the refrigerant overflowing from the low temperature section to the high temperature section 20 until the food storage space 4 is reduced to the desired temperature. When the temperature in the food storage space 4 is decreased to the desired degree, the thermostat 48 opens switch 65 to deenergize the heating coil 57 and stop operation of the vapor liquid-lift. Surplus refrigerant overflowing from the low temperature section then bypasses the high temperature section as previously explained. As the low temperature section operates at such a low temperature, for example, 0° F. with respect to the temperature of the food storage space 4, for example 40° F., the thermostat 47 will always call for refrigeration before the thermostat 48. Therefore, the refrigeration system will operate to supply refrigerant to the low temperature section 7a and liquid refrigerant overflowing from the section will only be supplied to the high temperature section 7b when required as regulated by the thermostat 48 responsive to a temperature affected by the high temperature section. Thus, the drain conduit 45 and heat operated device 46 regulate the supply of refrigerant to the separate sections of the evaporator 7 in accordance with the particular load conditions in the freezing compartment 5 and food storage space 4, respectively. Such an evaporator arrangement also permits the food storage compartment 4 to be refrigerated with a non-frosting coil.

In Fig. 2 a modified construction is illustrated by which refrigerant is continually fed to the high temperature section 7b at a minimum rate and intermittently supplied at a maximum rate by the heat operated device 54 as controlled by the thermostat 48. The arrangement illustrated in Fig. 2 is substantially identical with that illustrated in Fig. 1 except for an added restricted feed conduit 70 connected between the leg 49 of the liquid trap 52 and the top of the high temperature evaporator section 7b. The feed conduit 70 may be of such cross-sectional area as to pass only a limited amount of liquid refrigerant or may contain a restrictive orifice therein for limiting the amount of liquid refrigerant flowing therethrough. The restricted feed conduit 70 is connected to leg 49 of U-shaped conduit 45 below the connection of the overflow conduit 50 to the leg 51 so that refrigerant will flow to the high temperature evaporator section 7b at a minimum rate before surplus refrigerant overflows into pipe 50.

The arrangement illustrated in Fig. 2 operates in the same way as explained with respect to Fig. 1 except that a minimum amount of liquid refrigerant is continually fed to the high temperature evaporator section 7b. While the arrangement in Fig. 2 may not produce as close a control of the food storage space 4 as the arrangement illustrated in Fig. 1, it has the advantage of decreasing the amount of refrigerant vaporized when refrigerant is most needed and also providing a greater amount of liquid refrigerant for useful refrigeration.

It will now be observed that the present invention provides a novel refrigerant control in a refrigeration system to regulate the relative amounts of refrigerant supplied to the low and high temperature sections of the evaporator to balance and maintain the load in the separate freezing and food storage compartments at any operating condition. It will also be observed that the present invention provides a refrigeration system having separate high and low temperature evaporator sections with a separate control for each section to balance the load between the sections. It will still further be observed that the present invention provides a refrigeration system having separate evaporator sections in the freezing and food storage compartments of a refrigerator with a refrigerant drain conduit bypassing the high temperature evaporator section and a heat operated vapor liquid-lift for delivering refrigerant from the drain conduit to the latter section in accordance with requirements. It will still further be observed that the present invention provides a refrigerant control arrangement for balancing the load in the freezing and food storage compartments which is of simple and compact construction, economical to manufacture and reliable in operation.

While two forms of the invention are herein illustrated and described, it will be understood that further modifications may be made in the construction and arrangement of elements without departing from the spirit or scope of the invention. Therefore, without limitation in this respect, the invention is defined by the following claims.

I claim:

1. In a refrigerator, a cabinet having separate compartments, a refrigeration system comprising an evaporator having a low temperature section and a high temperature section in the separate compartments of the cabinet, each of said sections being arranged for gravity flow of refrigerant therethrough, a refrigerant liquefier in the system connected to deliver refrigerant to the top of the low temperature section, a drain conduit connected to receive liquid refrigerant overflowing from the bottom of the low temperature section and constructed to accumulate refrigerant therein, a vapor liquid-lift connected between the drain conduit and the top of the high temperature section and comprising a riser, a heater in thermal contact with the riser for heating the latter to expel vapor and raise liquid from the drain conduit to the high temperature section of the evaporator, and a control for the heater responsive to a temperature condition affected by the high temperature evaporator section for delivering liquid refrigerant thereto as required.

2. In a refrigerator according to claim 1 in which the heater is an electric heating element in thermal contact with the riser of the vapor liquid-lift and connected to a source of electric current, and the control is a switch in the connection to the source of electric current and a thermostat connected to actuate a switch.

3. In a refrigerator according to claim 1 in which the drain conduit is constructed to provide a liquid trap with the riser of the vapor liquid-lift extending upwardly therefrom above the top of the high temperature evaporator section, a separating chamber surrounding the upper end of the riser, and a feed pipe connecting the bottom of the separating chamber to the top of the low temperature evaporator section and through which liquid refrigerant flows to the latter by gravity.

4. In a refrigerator in accordance with claim 1 in which the drain conduit is U-shaped with one leg connected to the bottom of the low temperature evaporator section, an overflow conduit connecting the opposite leg to the outlet from the high temperature evaporator section to bypass the latter, and the riser of the vapor liquid-lift being connected to the bottom of the U-shaped conduit between the upright legs.

5. In a refrigerator in accordance with claim 1 in which the drain conduit is U-shaped with one leg connected to the bottom of the low temperature evaporator section, a restricting conduit connecting one of the legs of the U-shaped drain conduit to the top of the high temperature evaporator sections for continuously delivering liquid refrigerant thereto at a minimum rate, an overflow pipe having one end connected to one of the legs of the drain conduit above the connection of the restricting conduit and its opposite end connected to the outlet from the high temperature evaporator section to bypass the latter, and the riser of the vapor liquid-lift being connected to the bottom of the U-shaped drain conduit between the upright legs.

6. In a refrigerator in accordance with claim 1 in which the refrigeration system is of the absorption three-fluid type having a circuit for refrigerant, a circuit for absorbent, and a circuit for a pressure balancing inert gas, said refrigerant circuit comprising the liquefier and evaporator and the gas circuit comprising the evaporator, and said low temperature and high temperature evaporator sections being connected in series for the flow of gas therethrough.

7. In a refrigerator, a cabinet having separate compartments, a refrigeration system comprising an evaporator having a low temperature section and a high temperature section in the separate compartments of the cabinet, each of said sections being arranged for the gravity flow of refrigerant therethrough, a refrigerant liquefier in the system connected to deliver refrigerant to the top of the low temperature evaporator section, a U-shaped liquid trap having one leg connetced to the bottom of the low temperature evaporator section, a restricting pipe connected between the liquid trap and the top of the high temperature section for continuously feeding liquid refrigerant thereto at a minimum rate, an overflow pipe connected between the liquid trap and outlet from the high temperature evaporator section to bypass the latter, and a heat operated device in the liquid trap for regulating the flow of liquid refrigerant to the high temperature evaporator section.

8. In a refrigerator, a cabinet having separate compartments, a refrigeration system comprising an evaporator having a low temperature section and a high temperature section in the separate compartments of the cabinet, each of said sections being arranged for the gravity flow of refrigerant therethrough, a refrigerant liquefier in the system connected to deliver refrigerant to the top of the low temperature section, a U-shaped drain conduit connected to reecive liquid refrigerant overflowing from the bottom of the low temperature section and forming a liquid trap, a restricting pipe connecting one leg of the trap to the top of the high temperature section, an unrestricting overflow pipe having one end connected to one leg of the liquid trap in the drain conduit at a level above the restricting conduit and the other end connected to the outlet from the high temperature evaporator section to bypass the latter, a vapor liquid-lift connected to deliver liquid refrigerant from the trap to the top of the high temperature evaporator section, a heater for operating the vapor liquid-lift, and a control responsive to a temperature condition affected by the high temperature evaporator section for controlling the operation of the vapor liquid-lift.

WILLIAM R. HAINSWORTH.

References Cited in the file of this patent
UNITED STATES PATENTS

| Number | Name | Date |
|---|---|---|
| 2,264,292 | Brace | Dec. 2, 1941 |
| 2,426,811 | Backstrom et al. | Sept. 2, 1947 |
| 2,597,777 | Coons | May 20, 1952 |